July 16, 1935.  F. G. SEELEY  2,008,598
FILTERING APPARATUS
Filed Feb. 14, 1935  2 Sheets-Sheet 1
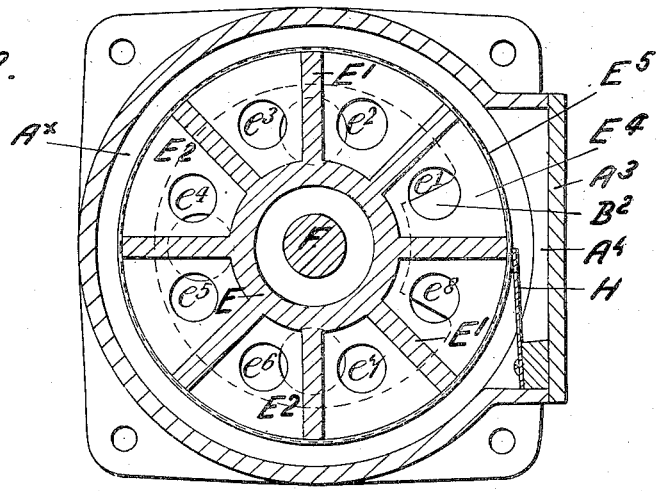
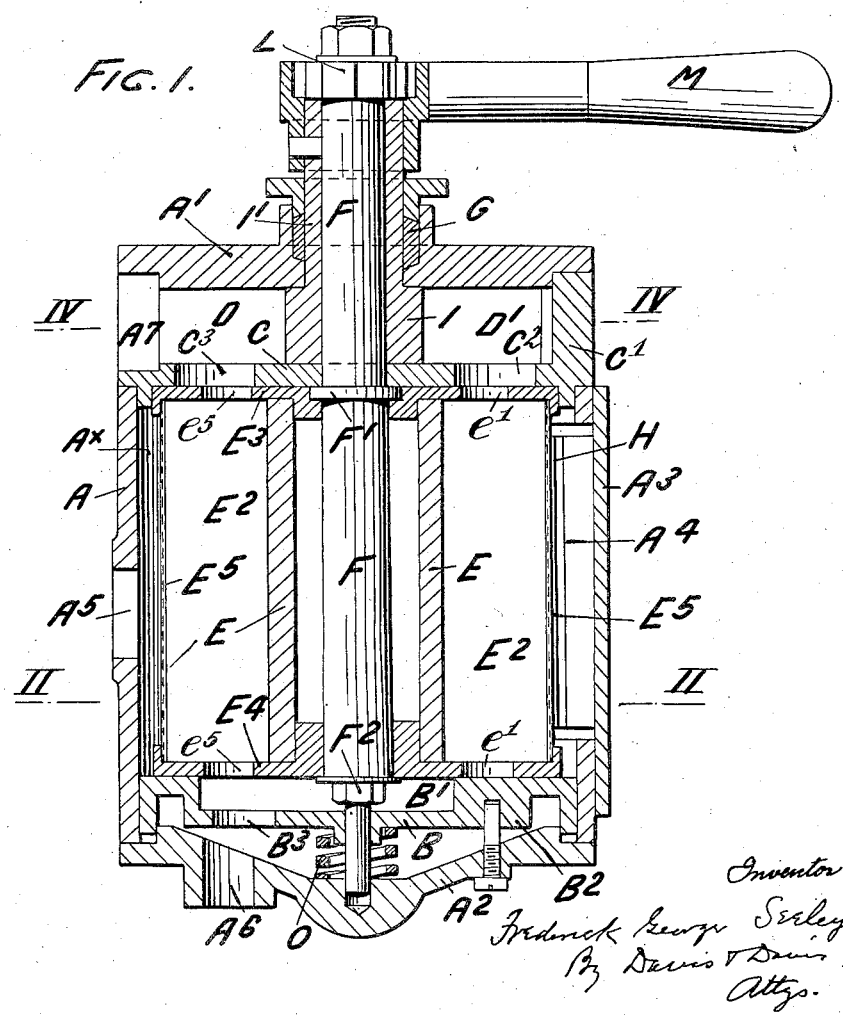

July 16, 1935.  F. G. SEELEY  2,008,598
FILTERING APPARATUS
Filed Feb. 14, 1935  2 Sheets-Sheet 2
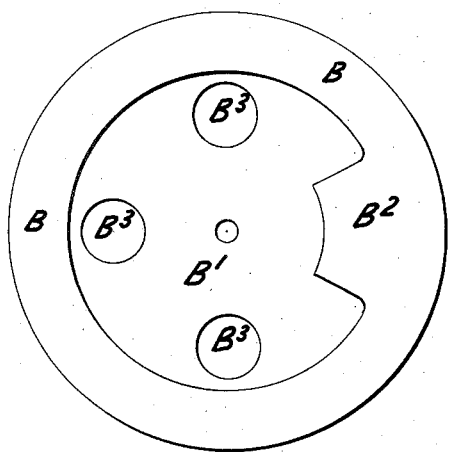
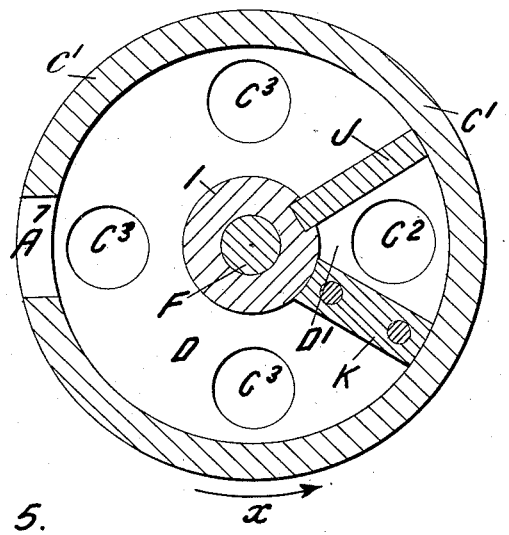
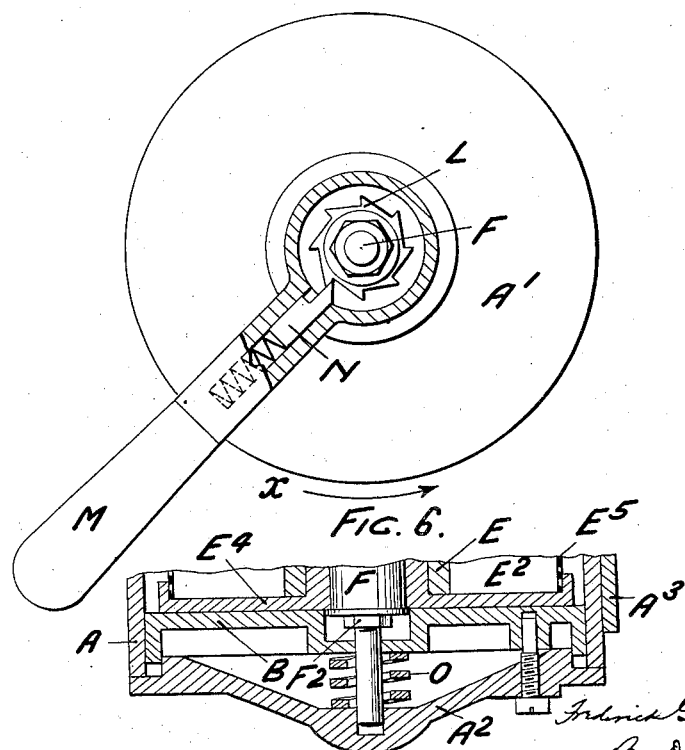

Patented July 16, 1935

2,008,598

UNITED STATES PATENT OFFICE 2,008,598

FILTERING APPARATUS

Frederick George Seeley, Ipswich, England

Application February 14, 1935, Serial No. 6,561
In Great Britain May 23, 1933

3 Claims. (Cl. 210—167)

This invention relates to improvements in filtering apparatus of the type in which a cylindrical filtering or straining element is mounted to rotate within a casing between end plates or bearings forming, with the casing, an inlet chamber for the liquid or semi-liquid material (hereinafter called for brevity, liquid) to be filtered or strained which passes through the peripheral portion of the straining element, formed of suitable filtering material, into the interior of the said element and thence to a clean liquid outlet, and in which means are provided for periodically forcing a portion of the filtered or cleaned liquid in the reverse or outward direction through successive portions of the filtering material and also means for removing separated matter deposited thereon or therein while the normal filtering or straining operation is taking place at other portions of the filtering material.

The present invention has for its object to provide filtering apparatus of the type referred to, better adapted than those heretofore used, to meet the requirements found necessary in practice and to avoid the difficulties experienced with known filtering apparatus, when dealing with semi-liquid substances such as food products, fruit pulp, paints, varnishes and the like, when frequent and thorough cleaning or sterilization of the apparatus is necessary.

To attain this object in a convenient and economical manner, the rotary cylindrical straining element used in filtering apparatus constructed according to the present invention comprises a longitudinal body portion having therein a circular series of longitudinally extending compartments covered peripherally by filtering or straining material such as wire gauze, perforated metal, fabric or other known filtering or straining material, and at the ends by plates one or each of which is provided with a circular series of holes through which the said compartments can be placed in communication with an outlet or outlets for filtered or strained liquid. The said cylindrical straining element is mounted to rotate between stationary end plates one or each of which has openings or ports therein so positioned that in any position of the straining element, fluid passing through the peripheral straining material into some of the longitudinal compartments, for example all except one, is free to pass through one or other or each of the said end plates to the outlet or outlets for filtered or cleaned liquid. The remaining longitudinal compartment registers with an opening in one of the stationary end plates that is in communication with a suitable pump for producing, periodically, a flow of cleaned fluid in the reverse direction to the normal flow, through a portion of the peripheral filtering material. A convenient and simple type of pump for the purpose mentioned, is one of the valveless radial vane type so positioned and arranged that, for example, with a straining element having say eight longitudinal compartments, a movement of the pump vane through an arc of say 45 degrees, will, through the medium of suitable mechanism, simultaneously rotate the straining element against a stationary collecting blade while forcing a portion of the cleaned fluid back through one of the longitudinal compartments and the portion of the filtering material covering that compartment which is in contact with the collecting blade. Eight successive forward movements of the pump vane will clean the whole of the filtering material covering the eight compartments of the straining element, and at all times, free delivery of strained fluid can take place from all the compartments except the one in the cleaning position.

A radial vane pump having its axis coincident with the axis of the rotary straining element, is economical in construction and convenient to operate, but any other type of pump, for instance one having a reciprocating plunger, could be used to operate in a similar manner.

A typical construction of filtering apparatus embodying the invention, is shown in the accompanying drawings in which:—

Fig. 1 is a longitudinal section through the axis of the filtering apparatus. Fig. 2 is a cross section on the line II—II of Fig. 1. Fig. 3 is an end view of a stationary lower end plate within the casing of the apparatus. Fig. 4 is a section on the line IV—IV of Fig. 1, showing a pump, and also holes or ports in an upper stationary end plate. Fig. 5 is a plan view of the upper cover of the apparatus showing an operating lever, pawl and ratchet wheel. Fig. 6 shows, in longitudinal section, a modified construction of a portion of the apparatus.

A is the enclosing body or casing of the filtering apparatus having upper and lower covers $A^1$ and $A^2$ respectively, a rear cover $A^3$ closing a sludge chamber $A^4$, an inlet $A^5$ for liquid to be filtered or strained, an inlet chamber $A^\times$ for liquid to be filtered, and an outlet $A^6$ for filtered or strained liquid. It may also be provided, if desired, with an outlet at $A^7$. B is a lower non-rotating end bearing plate recessed at its central portion $B^1$ and provided with a segmental shaped projection $B^2$ adapted to act as a masking device, as hereinafter described. C is an upper stationary end bearing plate formed with an upward extension or wall $C^1$ to form, in conjunction with the said plate C and the top plate $A^1$, a chamber D, a portion $D^1$ of which forms a reverse flow pump chamber.

The cylindrical straining element comprises a hub E provided with a number of radial plates $E^1$ forming between them a number of longitudinal compartments $E^2$, upper and lower end plates $E^3$ and $E^4$ and a cylindrical covering $E^5$ of filtering or straining material of the kind hereinbefore mentioned. In the example shown in Fig. 1, the straining element is formed with eight longitudinal compartments $E^2$, and each end plate $E^3$ and $E^4$ is provided with a corresponding number of holes $e^1$ $e^2$ ... $e^8$ communicating with the said compartments $E^2$. The straining cylinder is mounted upon and fixed to a spindle F, for example between a collar $F^1$ thereon and a nut $F^2$ so as to admit of its easy removal therefrom when desired. The spindle F is mounted to rotate in the upper and lower covers $A^1$ and $A^2$ of the casing A and extends through a stuffing box G carried by the upper cover $A^1$.

H is a scraper or collector blade mounted within the sludge chamber $A^4$ and arranged to bear approximately tangentially on the surface of the filtering material $E^5$ of the straining cylinder.

The valveless pump in the example shown, comprises the aforesaid pump chamber $D^1$, a hub I with a radial vane J mounted to rotate about the spindle F within the space between the cover $A^1$ and the plate C, and a stationary vertical end stop plate K extending radially from the hub I to the wall $C^1$ of the pump chamber $D^1$ and vertically between the said cover $A^1$ and plate C. The hub is provided with a tubular extension or sleeve $I^1$ surrounding the spindle F and extending through the stuffing box G. L is a ratchet wheel fixed to the projecting end of the spindle F, and M is an operating lever fixed to the projecting end of the sleeve $I^1$ and carrying a spring controlled pawl N engaging with the teeth of the ratchet wheel L. The number of teeth on the ratchet wheel L corresponds with the number of compartments $E^2$ in the straining cylinder.

The segmental projection or masking device $B^2$ on the plate B is so shaped and arranged that in any position into which the straining cylinder may be turned, it will approximately cover one of the holes $e^1$ to $e^8$ in the adjacent lower end plate $E^4$ of the cylinder, while leaving the remaining holes in free communication with each other through the recess $B^1$ in the plate B, and, through holes $B^3$ in the said plate B, with the outlet $A^6$ for cleaned fluid, if an outlet be provided in the cover $A^2$ as shown. The non-rotary plate B is held firmly against the adjacent end plate $E^4$ of the straining cylinder by a spring O.

The stationary upper end plate C is provided with a port $C^2$ positioned so as to provide a communication through one or two of the tubes $e^1$ to $e^8$ in the upper end plate $E^3$ of the straining cylinder, between the longitudinal compartment $E^2$ of the straining cylinder that is covered at its lower end by the projection or masking device $B^2$, and the preceding longitudinal compartment, and the pump chamber $D^1$. The said stationary plate C may also be provided with additional holes $C^3$, serving as exhaust ports, for enabling clean liquid to flow from the remaining compartments $E^2$ of the straining cylinder, through the remaining holes in the end plate $E^3$ thereof, to the chamber D and thence to the outlet $A^7$, if this outlet be provided. If two outlets $A^6$ and $A^7$ be provided, clean liquid can flow through both of them simultaneously, or through either of them, at will. When the end wall C is provided with exhaust ports $C^3$, as shown in Figs. 1 and 4, the end wall $E^4$ of the straining element may be unperforated and the adjacent end wall B of the inlet chamber be made flat and without a masking device and exhaust ports, as shown in Fig. 6. In this case, when the pump vane J makes its suction stroke, it will draw filtered liquid through the pump port $C^2$ solely from the compartment $E^2$ of the straining element opposite such port.

The apparatus works as follows:—Assuming the relative position of the parts to be as shown in Figs. 2 to 5, then, on admitting the fluid to be filtered or strained to the casing A through the inlet opening $A^5$, it will flow into the inlet chamber $A^x$ around the straining cylinder and thence through the filtering material $E^5$ into the longitudinal compartments $E^2$. It will thence flow through the holes $e^2$ to $e^8$ in the lower end plate $E^4$ of the straining cylinder into the recess $B^1$ of the plate B and through the holes $B^3$ in the plate to the outlet $A^6$ for clean liquid. If the outlet $A^7$ be provided, clean liquid may also be caused to flow from the longitudinal compartment $E^2$ through the holes $e^2$ to $e^8$ in the upper plate $E^3$, the holes $C^3$ in the plate C and chamber D to such outlet $A^7$. Clean fluid will also have entered the compartment $E^2$ that is above the projection or masking device $B^2$ and below the port $C^2$ in the plate C.

When it is desired to clean the filtering material $E^5$ from accumulated separated matter, the lever M is moved in the direction of the arrow $x$ (Fig. 5) so as to move the pump vane J away from the fixed plate K, through an angle of 45°. During this movement, previously strained clean liquid will flow from the recess $B^1$ in the plate B through the lower holes $e^1$ and $e^8$ of the straining cylinder into the two corresponding compartments $E^2$ thereof from which clean liquid will flow through the corresponding upper holes $e^1$ and $e^8$ of the cylinder through the port $C^2$ into the pump chamber D and fill that chamber with a definite quantity of clean liquid. Upon moving the lever M in the reverse direction, the pump vane J will be moved in the reverse direction to force clean liquid from the pump chamber, and the straining cylinder will also be rotated through one eighth of a revolution. During the first part of this movement, the upper hole $e^8$ of the cylinder will pass out of communication with the port $C^2$, the upper hole $e^1$ will be brought wholly below the said port $C^2$ and the corresponding lower hole $e^1$ will be brought wholly above the projection $B^2$ and be closed thereby, so that the clean liquid then forced from the pump chamber $D^1$ through the port $C^2$ into the compartment $E^2$ below it, will cause a corresponding quantity of clean liquid to be forced from that compartment in the reverse or outward direction through the portion of the filtering material $E^5$ covering that compartment and loosen or displace deposited matter thereon and enable it to be removed readily by the collector blade H bearing upon or adjacent to that portion of the filtering material. The succeeding portions of the filtering material covering the succeeding compartments $E^2$ can be cleaned of deposited matter in like manner as occasion may require.

The filtering apparatus instead of being arranged vertically as shown may if desired, be arranged horizontally with the inlet opening A⁵ at the top.

What I claim is:—

1. Filtering apparatus having an inlet chamber for liquid to be filtered, and an outlet for filtered liquid, a cylindrical straining element arranged within said chamber and comprising a longitudinal body portion having therein a circular series of longitudinally extending compartments covered peripherally by filtering material and at the ends by plates each formed with a circular series of holes communicating with said compartments, means for rotating said straining element in a step by step manner, a pump adapted to force filtered liquid through the successive holes in one of said plates and into one end of the corresponding compartments when the straining element is moved into successive positions, and means for masking the holes in the second series thereof opposite the one in the first mentioned series through which filtered liquid is being forced into the corresponding compartment, the holes in one series thereof except that communicating with the compartment into which filtered liquid is being forced by the pump, being in communication with the outlet for filtered liquid.

2. Filtering apparatus comprising a casing having an outlet for filtered liquid, and oppositely arranged end covers, walls arranged within said casing at a distance from said covers and forming therewith outer end chambers and the end walls of an intermediate inlet chamber for liquid to be filtered, one of said end walls being stationary and formed with a pump port and the opposite end wall being non-rotary and provided on its inner side with a recessed portion having exhaust ports therein communicating with the said outlet for filtered liquid and with a laterally disposed masking device arranged opposite said pump port, spring means adapted to press said recessed wall towards the opposite wall, a rotary cylindrical straining element arranged between and bearing against the end walls of said inlet chamber, said straining element comprising a longitudinal body portion having therein a circular series of longitudinally extending compartments covered peripherally by filtering material and at the end by plates each provided with a circular series of holes communicating with the respective compartments of the straining element, the holes in one series being arranged to come successively opposite the pump port and the holes in the opposite series being arranged to come successively opposite said masking device, by rotation of said straining element, a spindle fixed to said straining element and extending through one of said end covers, means adapted to remove deposited matter from the exterior of said straining element, a valveless pump comprising a chamber formed of a portion of the outer chamber adjacent to the end wall provided with a pump port and in communication with said port and a vane arranged to turn in said pump chamber and around said spindle and provided with a sleeve extending through said end cover, a ratchet wheel fixed to the outer end of said spindle, a lever fixed to the outer end of said sleeve and a pawl carried by said lever and adapted, when the lever is turned in one direction, to overrun said wheel and when turned by said lever in the opposite direction, to turn said wheel, spindle and straining element.

3. Filtering apparatus comprising a casing having an outlet for filtered liquid and oppositely arranged end covers, walls arranged within said casing at a distance from said end covers and forming therewith outer end chambers and the end walls of an intermediate inlet chamber for liquid to be filtered, one of said end walls being stationary and formed with a pump port and with a series of exhaust ports communicating through the adjacent outer chamber with the outlet for filtered liquid, spring means arranged to press the opposite wall towards the first mentioned wall, a rotary cylindrical straining element arranged between and bearing against the end walls of said inlet chamber, said straining element comprising a longitudinal body portion having a circular series of longitudinally extending compartments therein covered peripherally by filtering material and at the ends by plates, that one of which adjacent to the end wall provided with the pump port and exhaust ports being formed with a circular series of holes communicating with the respective compartments of the straining element, the said holes being arranged to come successively opposite the pump port and opposite the exhaust ports in the adjacent end wall of the chamber, means adapted to rotate said straining element intermittently and means adapted intermittently to force filtered liquid into the respective compartments of said element through said pump port.

FREDERICK GEORGE SEELEY.